United States Patent
Huda

(10) Patent No.: US 10,628,551 B2
(45) Date of Patent: Apr. 21, 2020

(54) PREVENTING CORNER VIOLATIONS IN FILL REGION OF LAYOUT USING EXCLUSION LAYER

(71) Applicant: GLOBALFOUNDRIES INC., Grand Cayman (KY)

(72) Inventor: Gazi M. Huda, Halfmoon, NY (US)

(73) Assignee: GLOBALFOUNDRIES INC., Grand Cayman (KY)

( * ) Notice: Subject to any disclaimer, the term of this patent is extended or adjusted under 35 U.S.C. 154(b) by 88 days.

(21) Appl. No.: 15/971,280

(22) Filed: May 4, 2018

(65) Prior Publication Data
US 2019/0340326 A1   Nov. 7, 2019

(51) Int. Cl.
| | |
|---|---|
| *G06F 17/50* | (2006.01) |
| *H01L 27/02* | (2006.01) |
| *G03F 1/36* | (2012.01) |
| *H01L 21/321* | (2006.01) |
| *G03F 1/00* | (2012.01) |

(52) U.S. Cl.
CPC .......... *G06F 17/5081* (2013.01); *G03F 1/144* (2013.01); *G03F 1/36* (2013.01); *H01L 21/3212* (2013.01); *H01L 27/0207* (2013.01); *G06F 2217/12* (2013.01)

(58) Field of Classification Search
CPC .......... G03F 1/36; G03F 1/72; G06F 17/5068; G06F 17/5081
USPC ........................................ 716/50, 55–56, 112
See application file for complete search history.

(56) References Cited

U.S. PATENT DOCUMENTS

| | | | |
|---|---|---|---|
| 7,509,622 B2 | 3/2009 | Sinha et al. | |
| 8,627,245 B1 | 1/2014 | Banerjee et al. | |
| 2004/0064797 A1* | 4/2004 | Li | G06F 17/5081 716/112 |
| 2009/0055793 A1 | 2/2009 | Melzner | |
| 2009/0241085 A1* | 9/2009 | De La Cruz | G03F 1/36 716/50 |

(Continued)

OTHER PUBLICATIONS

Dhumane, Nishant, "Critical Area Driven Dummy Fill Insertion to Improve Manufacturing Yield" (2012). University of Massachusetts Amherst ScholarWorks@UMass Amherst, Masters Theses 1911—Feb. 2014.824., 61 pages.

(Continued)

*Primary Examiner* — Paul Dinh
(74) *Attorney, Agent, or Firm* — Anthony Canale; Hoffman Warnick LLC

(57) ABSTRACT

Methods according to the disclosure identify at least one corner violation including a pair of fill cells of the fill region having a corner-to-corner shape profile that violates a manufacturing specification for the fill region of the IC layout; creating an exclusion layer for the at least one corner violation of the IC layout; removing the at least one corner violation from the fill region using the exclusion layer to form a modified IC layout, wherein at least a portion of each of the pair of fill cells remains in the modified IC layout after removing the at least one corner violation; and manufacturing the modified IC layout to include a fill shape based on the fill region after removing the at least one corner violation, the fill shape being compliant with the manufacturing specification for the fill region of the IC layout.

20 Claims, 8 Drawing Sheets

(56) References Cited

U.S. PATENT DOCUMENTS

2013/0080980 A1\* 3/2013 Wang .................. G06F 17/5081
                                                            716/52
2019/0005180 A1   1/2019 Yeh et al.
2019/0340326 A1  11/2019 Huda

OTHER PUBLICATIONS

Chen, Huang-Yu, Chang, Yao-Wen, "Density Gradient Minimization with Coupling-Constrained Dummy Fill for CMP Control", National Taiwan University, Taiwan, Chou, SZU-JUI, Synopsys, Inc, Taiwan, 24 pages.

Chen, Tung-Chieh, Cho, Minsik, Pan, David Z., and Chang, Yao-Wen, "Metal-Denisty-Driven Placement for CMP Variation and Routability", IEEE Transactions on Computer-Aided Design of Integrated Circuits and Systems, vol. 27, No. 12 Dec. 2008, 11 pages.

U.S. Appl. No. 16/013,403, Office Action dated Nov. 22, 2019, 13 pages.

\* cited by examiner

PREVENTING CORNER VIOLATIONS IN FILL REGION OF LAYOUT USING EXCLUSION LAYER

BACKGROUND

Technical Field

The present disclosure relates to integrated circuit (IC) fabrication. More specifically, the present disclosure relates to processes for preventing corner violations in a fill region for an IC mask layout by using an exclusion layer to eliminate the corner violations.

Related Art

Fabrication foundries ("fabs") manufacture ICs using photolithographic processes. Photolithography is an optical printing and fabrication process by which patterns on a photolithographic mask (simply "mask" hereafter) are imaged and defined onto a photosensitive layer coating of a substrate. To manufacture an IC, masks are created using an IC layout as a template. The masks contain the various geometries of the IC layout, and these geometries may be separated with layers of photoresist material. The various geometries contained on the masks correspond to the various base physical IC elements that make up functional circuit components such as transistors, interconnect wiring, via pads, as well as other elements that are not functional circuit elements but are used to facilitate, enhance, or track various manufacturing processes. Through sequential use of the various masks corresponding to a given IC in an IC fabrication process, a large number of material layers of various shapes and thicknesses with different conductive and insulating properties may be built up to form the overall IC and the circuits within the IC layout.

The underlying design of an IC layout may greatly affect the quality and consistency of devices produced according to the layout. The total surface area of device features on a layer divided by the total surface of the layer itself, referred to as "feature density," is of particular interest in the manufacture of electronic devices. For example, chemical mechanical planarization (CMP), also known as "polishing," is a process in which portions of a layer are removed non-selectively to create a planarized upper surface. The planarized surface generally needs a minimum feature density in order to implement CMP successfully, and the presence of large gaps without features thereon may increase the risk of manufacturing errors. One technique for increasing the feature density of a layer is to place non-functional features, known as a "fill region" or individually as "fill cells," on the layer to increase the layer's feature density. Although a fill region is an effective tool to increase feature density, the shape and position of the individual fill cells must comply with an external specification for the layer where it is positioned. IC manufacturing conventionally includes analyzing the initial fill region design, followed by iterative rounds of correction and re-design until the structures meet the requirements for a particular product.

SUMMARY

A first aspect of the disclosure provides a method including a method including: identifying at least one corner violation in a fill region of an integrated circuit (IC) layout, wherein the at least one corner violation includes a pair of fill cells of the fill region having a corner-to-corner shape profile that violates a manufacturing specification for the fill region of the IC layout; creating an exclusion layer for the at least one corner violation of the IC layout; removing the at least one corner violation from the fill region using the exclusion layer to form a modified IC layout, wherein at least a portion of each of the pair of fill cells remains in the modified IC layout after removing the at least one corner violation; and manufacturing the modified IC layout to include a fill shape based on the fill region after removing the at least one corner violation, the fill shape being compliant with the manufacturing specification for the fill region of the IC layout.

A second aspect of the disclosure provides a computer program product stored on a computer readable storage medium, the computer program product including program code, which, when being executed by at least one computing device, causes the at least one computing device to: identify at least one corner violation in a fill region of an integrated circuit (IC) layout, wherein the at least one corner violation includes a pair of fill cells of the fill region having a corner-to-corner shape profile that violates a manufacturing specification for the fill region of the IC layout; create an exclusion layer for the at least one corner violation of the IC layout; remove the at least one corner violation from the fill region using the exclusion layer to form a modified IC layout, wherein at least a portion of each of the pair of fill cells remains in the modified IC layout after removing the at least one corner violation; and cause a manufacturing device to manufacture the modified IC layout to include a fill shape based on the fill region after removing the at least one corner violation, the fill shape being compliant with the manufacturing specification for the fill region of the IC layout.

A third aspect of the present disclosure provides a system including at least one computing device configured to perform a method by performing actions including: identifying at least one corner violation in a fill region of an integrated circuit (IC) layout, wherein the at least one corner violation includes a pair of fill cells of the fill region having a corner-to-corner shape profile that violates a manufacturing specification for the fill region of the IC layout; creating an exclusion layer for the at least one corner violation of the IC layout; removing the at least one corner violation from the fill region using the exclusion layer to form a modified IC layout, wherein at least a portion of each of the pair of fill cells remains in the modified IC layout after removing the at least one corner violation; and manufacturing the modified IC layout to include a fill shape based on the fill region after removing the at least one corner violation, the fill shape being compliant with the manufacturing specification for the fill region of the IC layout.

Figure 1:
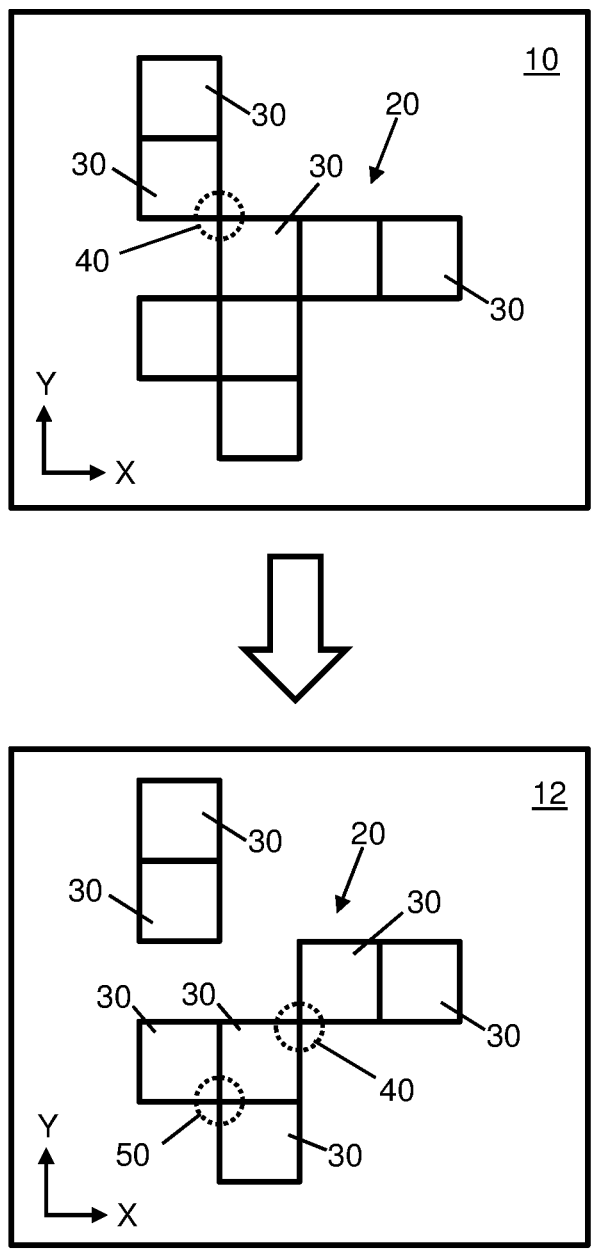
FIG. 1 provides a schematic view of a conventional process for removing corner violations from a fill region.

It is noted that the drawings of the disclosure are not necessarily to scale. The drawings are intended to depict only typical aspects of the invention, and therefore should not be considered as limiting the scope of the invention. In the drawings, like numbering represents like elements between the drawings.

DETAILED DESCRIPTION

In the following description, reference is made to the accompanying drawings that form a part thereof, and in which is shown by way of illustration specific exemplary embodiments in which the present teachings may be practiced. These embodiments are described in sufficient detail to enable those skilled in the art to practice the present teachings, and it is to be understood that other embodiments may be used and that changes may be made without departing from the scope of the present teachings. The following description is, therefore, merely illustrative.

Embodiments of the disclosure pertain to integrated circuit (IC) (alternatively, "circuit") manufacture. More specifically, embodiments of the disclosure pertain to improving the quality fill regions used in photolithographic processing in IC manufacture and positioned between functional components (e.g., wires, vias, device structures, etc.) of a circuit. Methods according to the disclosure may involve analyzing the design of a fill region to be formed between other features of a mask, e.g., a dummy fill to increase the feature density of a particular layer and improve the outcome of planarization. The method preemptively identifies corner violations in a fill region, e.g., particularly narrow or closely-positioned fill cells which may pose a risk of violating a manufacturing specification for the layer under analysis. To prevent the corner violation from occurring, an exclusion layer modifies the identified fill cells without removing them entirely, and thereby prevents new corner violations from appearing in other portions of the integrated circuit. The modified IC layout with the exclusion layer may be stored for future use, e.g., to manufacture other product units or to assist with the design and manufacture of other products.

To better illustrate the various embodiments of the present disclosure, particular terminology which may be known or unknown to those of ordinary skill in the art is defined to further clarify the embodiments set forth herein. The term "system" refers to a computer system, server, etc. composed wholly or partially of hardware and/or software components, one or more instances of a system embodied in software and accessible a local or remote user, all or part of one or more systems in a cloud computing environment, one or more physical and/or virtual machines accessed via the internet, other types of physical or virtual computing devices, and/or components thereof. The terms "layout" or "mask layout" refer to a complete or partial mapping of masking material to be used for forming (e.g., by various combinations of etching, deposition, etc.) a particular layer which includes multiple features ("features"). A "manufacturing specification" refers to any user-defined measure(s) for distinguishing masks that are viable for manufacture from masks that are not viable for manufacture. Manufacturing specifications may include a comprehensive listing of such measurements, including for example design features, dimensions, performance requirements, etc., for all measurable aspects of a device to be manufactured. However, rules in a manufacturing specification for determining whether particular layers are compliant or non-compliant are particularly relevant to embodiments discussed herein. In the example of a front end of line (FEOL) layer (i.e., layers of a device formed before the first metallization and including device components such as transistors, resistors, capacitors, etc.), a manufacturing specification may include a "mask rule" for the layer to be produced. Mask rules refer to dimensional requirements and other measurements for determining whether a particular mask will cause mask inspection problems. In the example of a back end of line (BEOL) layer, i.e., layers of a device after the first metallization, e.g., layers containing wires and vias for coupling functional components together, a manufacturing specification may include a "design rule" for the layer to be produced. Design rules refer to minimum dimensions of devices and interconnects to be formed in an integrated circuit adopted during the design stage, and determined by the capabilities of process technology available. Mask rules and design rules are distinct from each other, e.g., by using different types of information about a layout to determine its compliancy or non-compliancy. Mask rules in particular examine an entire mask layout and the spatial relationship between multiple patterns in their final orientation, scale, and tone. In contrast, design rule analysis is usually performed on individual pattern files.

The layout for a particular mask may be obtained from design data and/or generated, modified, etc., with the aid of optical proximity correction (OPC) or other design-enhancement systems. A "feature" generally refers to a functional element in an IC product (e.g., a wire) which must be printed on a wafer using photolithography techniques. A "region" refers to any subset of a given mask. A "pattern" or "feature pattern" refers to a design layout representation of one or more portions of a mask which define the features to be formed in a particular IC product, and which may be formed with the aid of a mask by way of, for example, direct-write electron beam lithography. The patterns in a mask may be structured and positioned to cover underlying materials, and thereby protect them from being etched away while other portions of a layer are being removed.

The term "fill region" refers to any set of features included in the design of a particular layer to fill empty space between other portions of a device. Fill regions may have a variety of material compositions and/or may be included to perform a wide variety of functions in a device which includes IC components therein. One example of a "fill region" may include a "dummy fill region" created to increase the feature density of a particular mask. "Feature density" itself may be expressed in a simplified form as the surface area of all features on a mask divided by the surface area of the mask, or the same quantities over an isolated portion of the mask. A higher feature density is generally desired for IC manufacture because non-selective processes for removing material from a layer (e.g., CMP as noted above) are less likely to encounter large portions of empty space, which may cause discrepancies between the processing of different regions.

A "fill cell" refers to a single two-dimensional body included in a mask to provide part of a fill region. A fill region thus may be defined as a collection of individual fill cells. Each fill cell may include metal(s), wires, features, mandrel structures, etc., for processing of the IC. Dummy fill regions in particular may lack functional electrical components of the device structure to be manufactured. Dummy fill regions thus do not provide any "active" functions, are almost never connected to power-ground, and thus have no bearing on the actual circuit design. A dummy fill region's purposes are thus to assist in CMP, and to a more limited extent aid in other lithographic processes and/or FEOL etch-color balancing. A "corner violation" refers to a design defect to be avoided in the creation of fill regions, and may be defined as any pair of opposing corners for two fill cells whose separation distance violates a minimum reference value defined in the manufacturing specification. The Required corner-to-corner separation between two fill cells is strictly dictated by process integration. If a particular shape in a fill region is below a predetermined amount, violating feature will flag the design-rule check as being a non-compliant structure. According to an illustrative example, the predetermined corner-to-corner separation distance between two adjacent but discontinuous fill cells may be approximately the same as a length or height dimension for one fill cell. In some cases a "corner violation" may include the two fill cells being joined together at their opposing corners despite not being connected in the original design of the fill region. The terms "kissing corner," or "corner-to-corner bridge," are common names for corner violations in which the two fill cells physically connect to each other at their adjacent corners. The presence of corner violations may negatively affect the functionality of the layer to be manufactured. Corner violations may increase the risk of structural or errors caused by the metallic connection between two fill cells that should not be joined to one another. In particular, corner violations and/or other fill defects may be difficult or impossible to print on a wafer, and such structural issues will be flagged in the metrology stage as a structural non-compliancy.

Referring initially to FIG. 1, a conventional technique for removing corner violations from a fill region is shown for the sake of comparison. Various technical limitations of the process depicted in FIG. 1 are pre-empted by implementing embodiments of the present disclosure, as described with respect to the subsequent FIGS. 2-8. FIG. 1 shows an initial mask layer 10 to be manufactured with a fill region 20 to increase the feature density of mask layer 10. Mask layer 10 may represent, e.g., a FEOL layer or BEOL layer of a particular product, and the characteristics of the conventional process would be applicable to each type of layer. Functional features of mask layer 10 are not shown in FIG. 1 solely to emphasize fill region 20. Fill region 20 will be included in the same manufacturing layer as electrically functional components of a particular device. Fill region 20 may include a set of square-shaped fill cells 30, which together form the entire fill region 20. The foundry responsible for creating a product will create fill region 20 to have a size that is as large as possible, provided that fill region 20 complies with the specification(s) for mask layer 10.

Initial mask layer 10 is shown to include a single corner violation 40 between two fill cells 30. Corner violation 40 is positioned between two fill cells 30 that are adjacent to each other but discontinuous. That is, the two fill cells 30 with corner violation 40 are not separated from each other by other fill cells 30 but do not share a boundary along X-axis or Y-axis. Throughout the disclosure, "width" refers to the direction extending along in parallel with X-axis, while "height" refers to the direction extending along or in parallel with Y-axis. The corners of the discontinuous fill cells 30 may contact each other or are unacceptably close in proximity according to manufacturing specifications. In the design of initial mask layer 10, the two fill cells 30 exhibiting corner violation 40 may have a separation distance that is less than the minimum separation distance required between two discontinuous cells of initial mask layer 10. Initial mask layer 10 thus would violate its manufacturing specification if it were printed without further modifications.

The conventional methodology for bringing initial mask layer 10 into compliance with manufacturing specifications is to sacrifice some amount of the fill density offered through fill region 20 and remove fill cell(s) 30 associated with corner violation 40. Ideally, simply removing these fill cell(s) 30 would make mask layer 10 compliant with manufacturing specifications. This is rarely the case. In most instances, removing some fill cell(s) 30 will cause new corner violations 40 to appear between other fill cells. For example, design software may automatically target and remove one fill cell 30 of initial mask layer 10 associated with corner violation 40. The new design is shown as a modified mask layer 12. Although the original corner violation 40 is gone, a new corner violation 40 now appears between two other fill cells 30. If the designer repeats the same process, to remove another fill cell 30 to eliminate the new corner violation 40, a potential corner violation 50 between two other fill cells 30 may turn into yet another corner violation 40. In conventional settings, a circuit manufacturer will simply repeat this process of removing fill cells 30 until all of the corner violations are gone. However, this consumes a significant amount of manufacturing time and cost, and decreases the feature density of mask layer 10. Embodiments of the disclosure remove corner violations via a non-iterative method and with fewer losses to the feature density of a layer.

Figure 2:
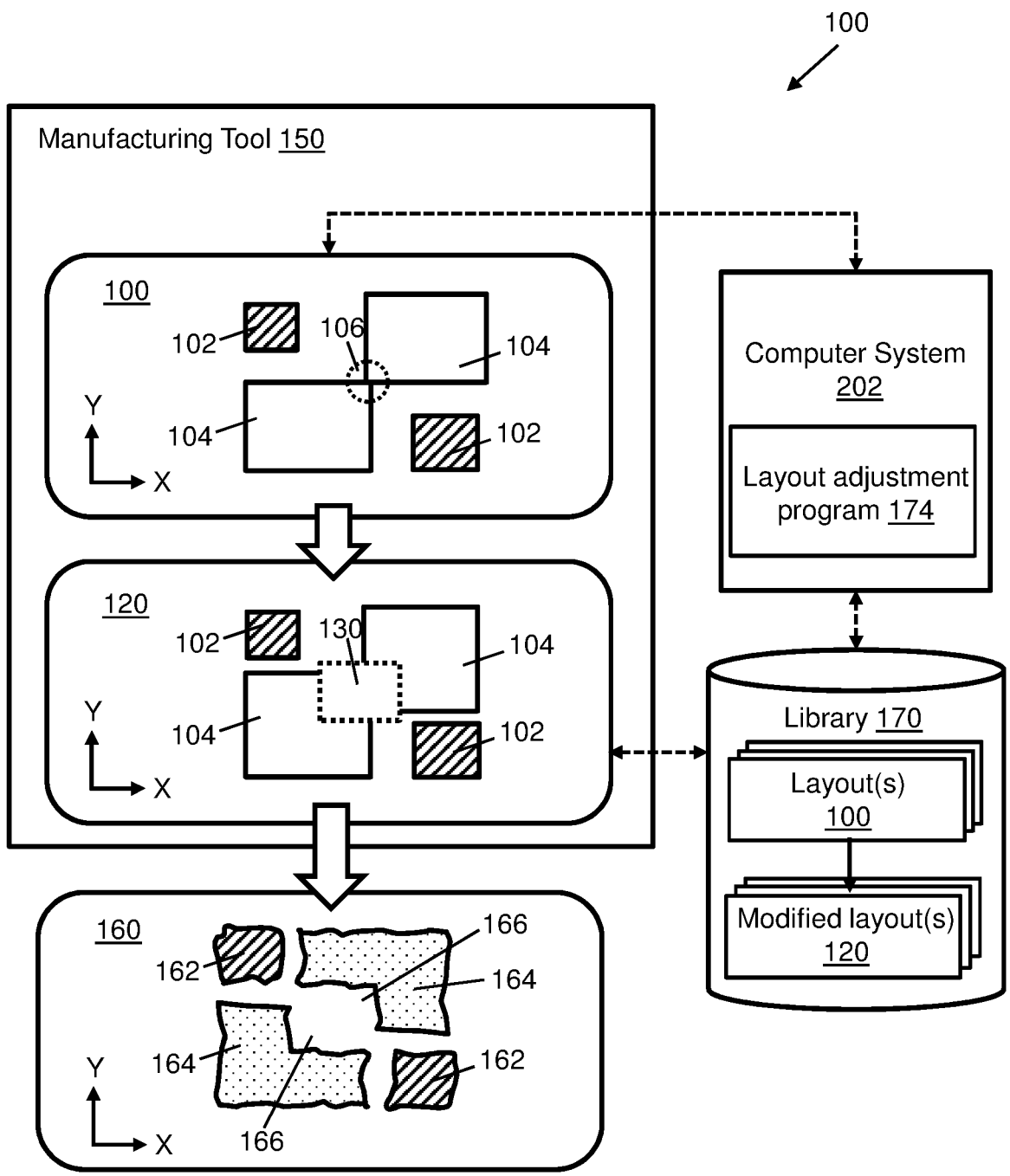
FIG. 2 provides a schematic view of a system and method for preventing corner fill violations with an exclusion layer according to embodiments of the disclosure.

FIG. 2 provides a schematic data flow diagram of components and processes for using an exclusion layer to prevent corner violations in a fill region according to embodiments of the disclosure. FIG. 2 illustrates a layout 100 indicative of at least a portion, in plane X-Y, of a mask to be manufactured as part of an integrated circuit (IC). Layout 100 may include, e.g., one or more non-dummy features 102 which form vias, wires, transistors, capacitors, and/or other functional components of a product to be formed. Non-dummy features 102 may be created to implement operational features of a product, and thus may be fixed in the design of layout 100 before the present disclosure is implemented. Empty space between non-dummy features 102 may be occupied by fill cells 104 to increase the feature density of layout 100, as discussed elsewhere herein. Fill cells 104 collectively form a fill region of layout 100. Each fill cell 104 may not serve functional purposes in layout 100 for an IC product, and may be added or removed as needed to provide sufficient feature density. A corner violation 106 may appear in layout 100, e.g., where opposing corners of two fill cells 104 are in close proximity to each other. As discussed herein, methods according to the disclosure may modify portions of selected fill cell(s) 104 to eliminate corner violations 106 in layout 100 without creating new corner violations or significantly reducing the total feature density in layout 100. Although two fill cells 104 are shown in layout 100 as an example, it is understood that layout 100 of FIG. 2 may represent only a portion of a larger layout for a mask to be printed. Moreover, in the case of multiple patterning lithography, layout 100 may correspond to one of several masks used in succession to manufacture a single layer of a device. In multiple patterning lithography, layout 100 represents one of several masks for printing a single layer. Layouts 100 used in multiple patterning often require a larger number of fill cells 104 as compared to other masks. Layout 100 depicted in FIG. 2 thus may represent a subset of a particular layer and/or one of several masks used to print the same layer.

Before layout 100 is used to manufacture part of a product, it is possible to identify the location of corner violation(s) 106 by use of conventional techniques for detecting non-compliance with specification rules. For example, each pair of discontinuous fill cells 104 with a corner-to-corner separation distance that is less than a minimum value can be flagged (e.g., via computer components such as hardware or software) as creating corner violation 106. The disclosure provides a method of eliminating corner violation(s) 106 without removing any fill cells 104 from layout 100. FIG. 2 illustrates, for example, constructing a modified layout 120 by using an exclusion layer to remove corner violation 106.

More particularly, embodiments of the disclosure introduce an exclusion layer 130 to create modified layout 120 and eliminate corner violation(s) 106. As shown previously in FIG. 1 and discussed above, conventional techniques remove one or more fill cells 104, and thus change the overall shape of a fill region made up of fill cells 104. By contrast, the present disclosure modifies the manner in which existing fill cells 104 of layout 100 are printed to avoid corner violations 106. Exclusion layer 130 make take the form of a separate layer in plane X-Y. In this case, exclusion layer 130 may be superimposed onto layout 100 to create modified layout 120. Exclusion layer 130 thus defines a region where fill material will not be deposited during manufacture, despite the presence of fill cell(s) 104 in portions of exclusion layer 130. The position of exclusion layer 130 may be concentric with the location of corner violation 106 in layout 100. The size and/or shape of exclusion layer 130 may be set by a user based on the characteristics of the layer and/or product to be manufactured. According to an example, exclusion layer 130 may have a length and width in plane X-Y of, e.g., approximately 0.20 micrometers (μm) by approximately 0.20 μm. Although a square exclusion layer 130 is shown in FIG. 2, it is understood that exclusion layer may be substantially rectangular, and/or other polygons with sides oriented orthogonally to each other or otherwise separated by varying angular orientations.

A manufacturing tool 150 (e.g., a single manufacturing tool and/or a group of interconnected devices) may be configured to create a manufactured mask 160 from modified layout(s) 120 which include exclusion layer(s) 130. Manufactured mask 160 may include one or more non-fill features 162 and fill features 164 formed based on, e.g., non-fill regions 102 and fill cells, 104 of modified layout 120. Manufacturing tool 150 may be operable to, e.g., cause manufacture of one or more features 162, 164 at positions designated with patterns 102, 104 in layout 100. As shown, printed features 162, 164 may vary in size, shape, etc., from their corresponding patterns 102, 104 in layout 100. Structural differences between patterns 102, 104 and printed features 162, 164 may be caused by processing variants, e.g., differences in light intensity, the position and operation of various components in manufacturing tool 150, proximity effects from other patterns in layout 100, etc. It is noted that manufactured mask 160 includes a pair of stepped regions 166, each within fill feature 164. Stepped regions 166 thus represent the effect of using exclusion layer 130 to create modified mask 120. Stepped region(s) within each fill feature 164 thus prevent corner violations from being formed in manufactured mask 160.

Systems according to the disclosure may include a library 170 for storing layout(s) 100 and/or modified layout(s) 120. In accordance with embodiments of the disclosure, library 170 is connected to and modified by a layout adjustment program 174 including, e.g., one or more systems for creating modified layout(s) 120 from layout(s) 100. Layout adjustment program 174 may be housed, e.g., in a computer system 202, and the various systems and modules therein may operate through one or more processing techniques described herein. Layout adjustment program 174 may select particular layout(s) 100 for analysis, and remove non-selected regions to create modified mask(s) 120 to eliminate corner violation(s) 106. Computer system 202 may be in communication with library 170, e.g., according to any currently-known or later developed solution for communicating between data repositories (e.g., library 170), computer systems (e.g., computer system 202), and/or other data repositories discussed herein.

Computer system 202 can aid in the design and manufacture of IC products by converting one or more layout(s) 100 into modified layout(s) 120 by creating and applying exclusion layer(s) 130. Modified layout(s) 120 therefore comply with manufacturing requirements by removing only portions of selected fill cell(s) 104, thereby substantially retaining the feature density from layout 100 in modified layout 120. Layout adjustment program 174 may perform such functions, e.g., by processing data from library 170 for one or more layouts 100. Layout adjustment program 174 may generate instructions for adjusting manufacturing tool (s) 150, based on the location of exclusion layer(s) 130 in modified layout(s) 120. Manufacturing tool(s) 150 may thereafter create manufactured mask 160 based on modified layout 120, instead of layout 100. Modified mask(s) 120 may be stored, e.g., in memory components of computer system 202 for future use. Example procedure for creating exclusion layer 130 and selecting its position in modified layout 120, in addition to example mask layouts suitable for embodiments of the disclosure, are provided in further detail below.

Figure 3:
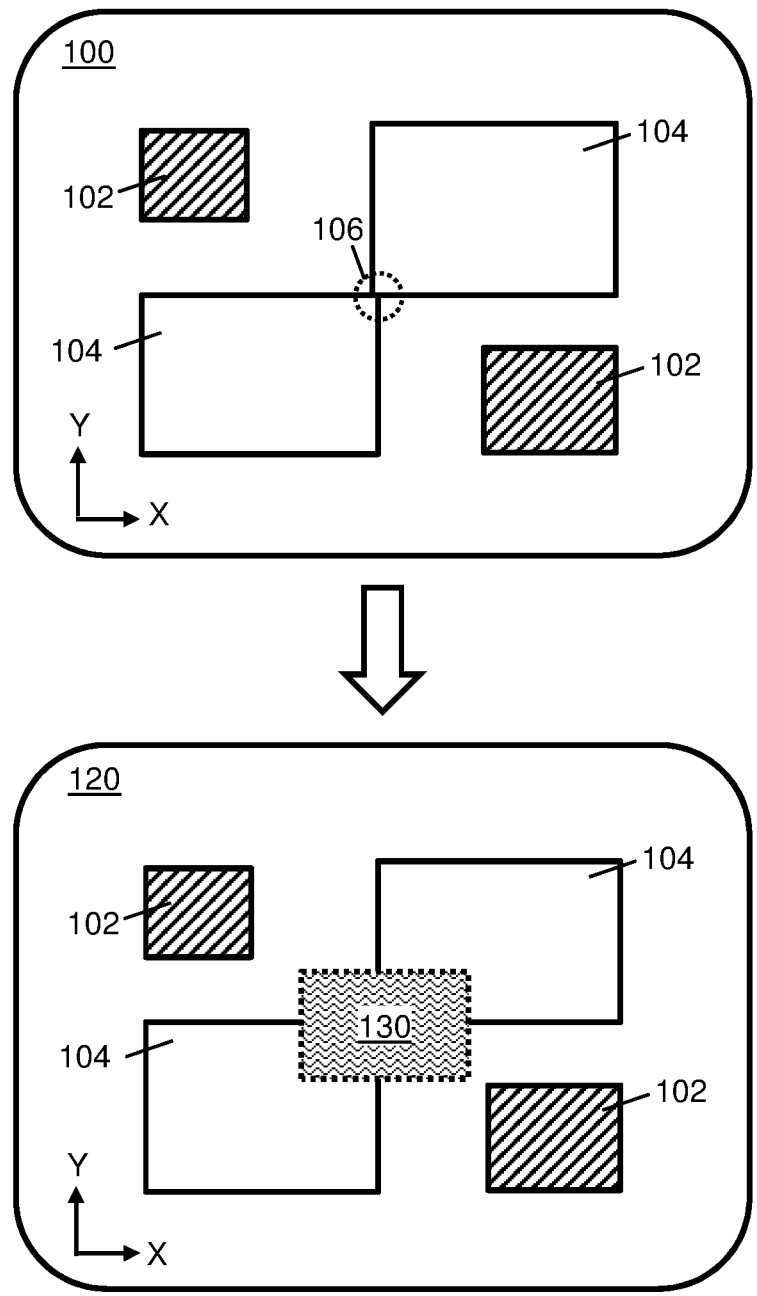
FIG. 3 provides a schematic view of using the exclusion layer to prevent a corner-to-corner bridge between fill cells according to embodiments of the disclosure.

Referring to FIG. 3, the use of exclusion layer 130 to eliminate a corner-to-corner bridge between fill cells 104 is shown as an example implementation. The initial form of layout 100 in FIG. 3 includes two fill cells 104 which are designed to be discontinuous with each other. However, the two fill cells 104 meet each other at their upper-right and lower-left corners, respectively. The corner-to-corner shape profile of fill cells 104 thus creates a corner violation in layout 100. In its original form, layout 100 does not comply with specification requirements which forbid a corner-to-corner bridge between two fill features that should be discontinuous with each other. As shown in FIG. 3, layout adjustment program 174 may create and apply exclusion layer 130 at the corner-to-corner meeting of fill cells 140. Exclusion layer 130 may remove portions of each fill cell 140 and may have a smaller length and width than each of the fill cell(s) 104 where it is positioned on modified layout 120. The resulting modified mask 120 continues to include the original fill cell(s) 104, with exclusion layer 130 removing corner violation 106 from the original layout 100.

Figure 4:
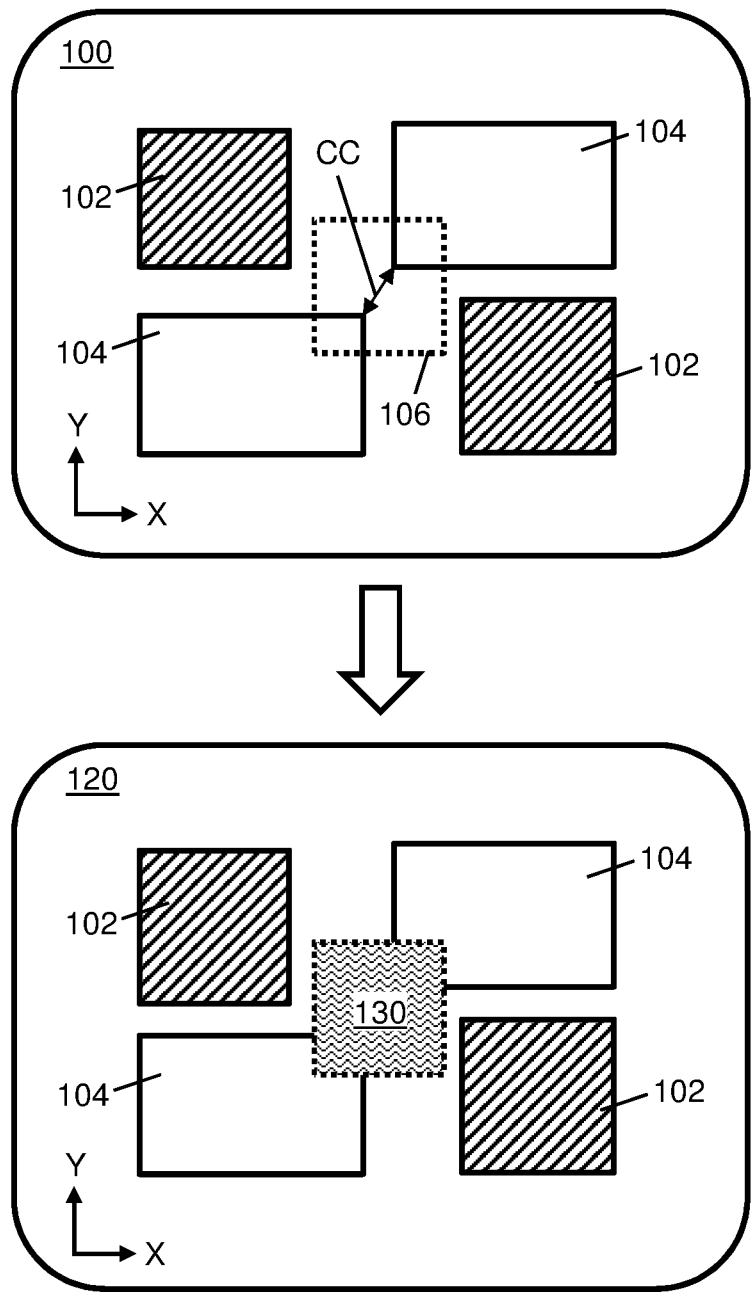
FIG. 4 provides a schematic view of using the exclusion layer to create additional separation distance between fill cells according to embodiments of the disclosure.

Referring to FIG. 4, the use of exclusion layer 130 to increase a corner-to-corner separation distance between fill cells 104 is shown as a further example. As noted elsewhere herein, specification requirements for a particular mask may include a corner-to-corner shape profile for each pair of adjacent discontinuous fill cells 104. The corner-to-corner shape profile may specify a minimum separation distance that is approximately equal to the length and/or width dimension in plane X-Y for each fill cell 104. In the example of FIG. 4, two discontinuous fill cells 104 are shown to have a separation distance CC that is less than the length or height of each fill cell 104. More specifically, separation distance CC may be approximately 0.2 µm, while each fill cell 104 may have a width along X-axis of approximately 1.0 µm and a length along Y-axis of approximately 0.6 µm. Although fill cells 104 may not necessarily become joined through a bridge when they are manufactured, they may nevertheless fail to comply with the specification requirements for mask 100. Layout adjustment program 174 can bring layout 100 into compliance with specification requirements by substantially the same process shown in FIG. 3. In particular, layout adjustment program 174 can create exclusion layer 130 having a smaller length and/or width in plane X-Y than each fill cell 104, yet may have a greater length and/or width than separation distance CC in layout 100. Layout adjustment program 174 can superimpose exclusion layer 130 on layout 100 to create modified layout 120. Exclusion layer 130 may be created to be concentric with a location that is midway between fill cells 104 in plane X-Y. Exclusion layer 130 thus increases the corner-to-corner separation between fill cells 104 without removing them entirely, and prevents corner violation 106 (FIG. 4) from appearing in the manufactured mask.

Figure 5:
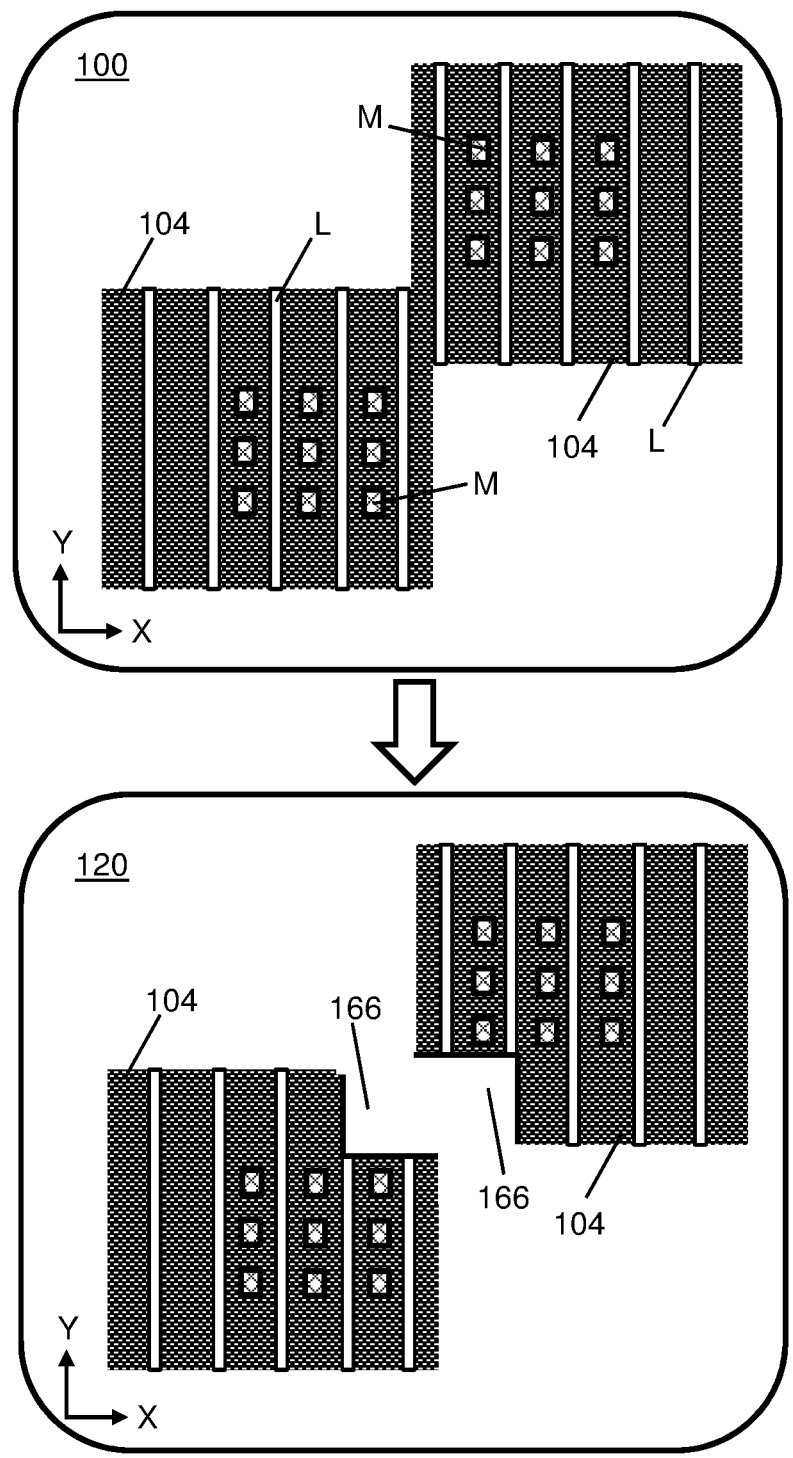
FIG. 5 provides a schematic view of preventing corner violations in a back end of line (BEOL) layer according to embodiments of the disclosure.

FIG. 5 provides an example of modifying a BEOL layout to remove corner violations according to the present disclosure. As noted above, BEOL layers may include wires and vias for connecting elements of a device to each other, and embodiments of the disclosure are effective for eliminating corner violations in dummy features to be formed between the wires and vias of a BEOL layer. Layout 100 of FIG. 5 shows two fill cells 104 each including a set of dummy components such as fill mandrels, metal fill regions, etc. Each fill cell 104 may be designed to be discontinuous with the other, yet may exhibit a corner-to-corner bridge in layout 100 and thus may include a corner violation. In the case of a BEOL layer, exclusion layer 130 (FIGS. 2-4) may be sized to prevent one or more dummy components of each fill cell 104 from being removed in modified layout 120. Modified layout 120 includes, e.g., stepped region 166 in place of the corner-to-corner bridge which appeared in layout 100. Stepped region 166, upon being included in modified layout 120, may remove part of a dummy line L in fill cell 104, while the original set of mandrels M in each fill cell 104 remain intact. Mandrels M typically appear in fill cells 104 as alternating mandrel and non-mandrel lines having a close density and minimal separation distance. Mandrels M are not shown to scale in FIG. 5 solely for clarity of illustration. Mandrels M 104 in each fill cell may remain intact, e.g., by sizing exclusion layer 130 to have a width and/or height that is less than the separation between particular components of fill cell 104 and the boundary of fill cell 104. The resulting modified mask 120 with stepped region 166 in each fill cell 104 may cause modified mask 120 to comply with a design rule for the BEOL layer under analysis.

Figure 6:
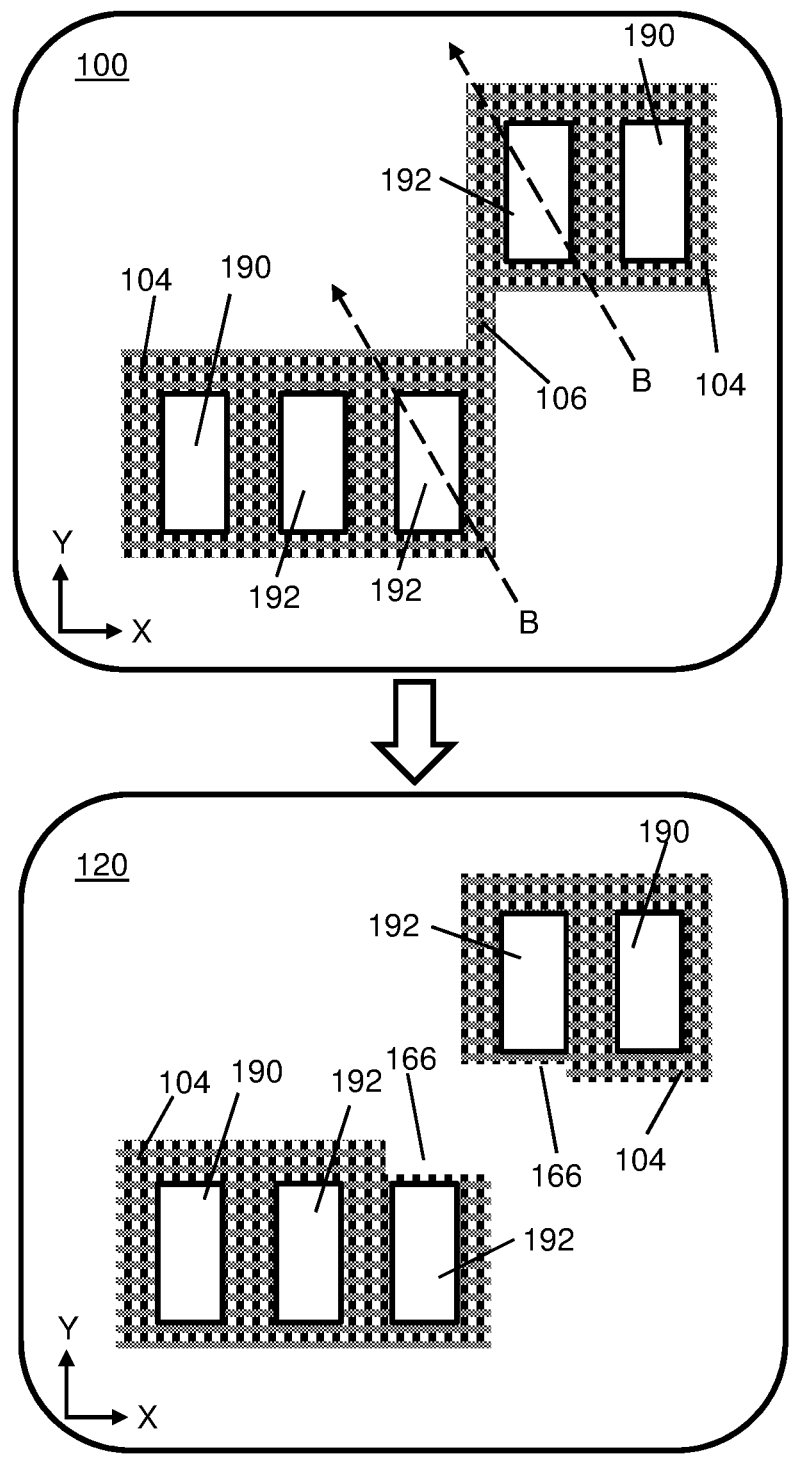
FIG. 6 provides a schematic view of preventing corner violations in a front end of line (FEOL) layer according to embodiments of the disclosure.

FIG. 6 provides an example of modifying a layout 100 of a FEOL layer to remove corner violations according to the present disclosure. The example of a FEOL provides further contrasts between the present disclosure and conventional processes for removing corner violations from a layout. Layout(s) 100 representing a FEOL layer mask may include several device shapes 190, 192. Each device shape 190, 192 generally takes the form of a dummy component, though it is possible for device shape(s) 190, 192 to be functional components in rare cases. In conventional settings, simply removing corner violation(s) 106 by removing dummy cells 104 from layout 100 may not be feasible unless they are subsequently "covered" by another dummy layer. In particular, some FEOL layers may be designed such that two or more device shapes 190 are designed to be separated by a particular number of other device shapes 192. Removing device shapes 192 from layout 100 of a FEOL layer may thus require the manufacturer to change the position of device shapes 190 originally positioned near a predetermined row of other device shapes 192. Conventional approaches for addressing this problem may include, e.g., printing layout 100 in its original form with corner violation 106 included and subsequently eliminating corner violation 106. One conventional approach for removing corner violation 106 may be, e.g., post-manufacture beveling of selected locations to remove corner violation 106. As shown in FIG. 6, however, beveling along lines B may still remove at least a portion of corresponding device shapes 192 and thereby interfere with the original design of layout 100. The use of beveling thus introduces additional computational time and engineering effort to ensure that the printed device continues to comply with mask rules for the corresponding FEOL layer.

Embodiments of the disclosure can eliminate the need for beveling in a FEOL layer, and its associated disadvantages. With continued reference to layout 100 for a FEOL layer shown in FIG. 6, an exclusion layer 130 (FIGS. 2-4) may be formed between two fill cells 104 of layout 100 for a FEOL layer and sized to prevent any device shapes 190 from being removed from their corresponding fill cell 104. The resulting modified layout 120 thus may include stepped region 166 between two fill cells 104, yet device shapes 190 may be substantially or completely intact after stepped region 166 is formed. It is understood that in some embodiments, at least a portion of device shapes 192 may be removed to form stepped region 166. To account for any partial removing of device shapes 192, the method may optionally include applying mask rules to modified layout 120. For example, further analysis of modified layout 120 may include determining whether a minimum number of device shapes 192 remain intact between other device shapes 190 within modified layout 120. In any case, the total amount of processing time, and possible reductions in feature density, are far less than the conventional approach for removing corner violation(s) 106 through the beveling of fill cells 104.

Figure 7:
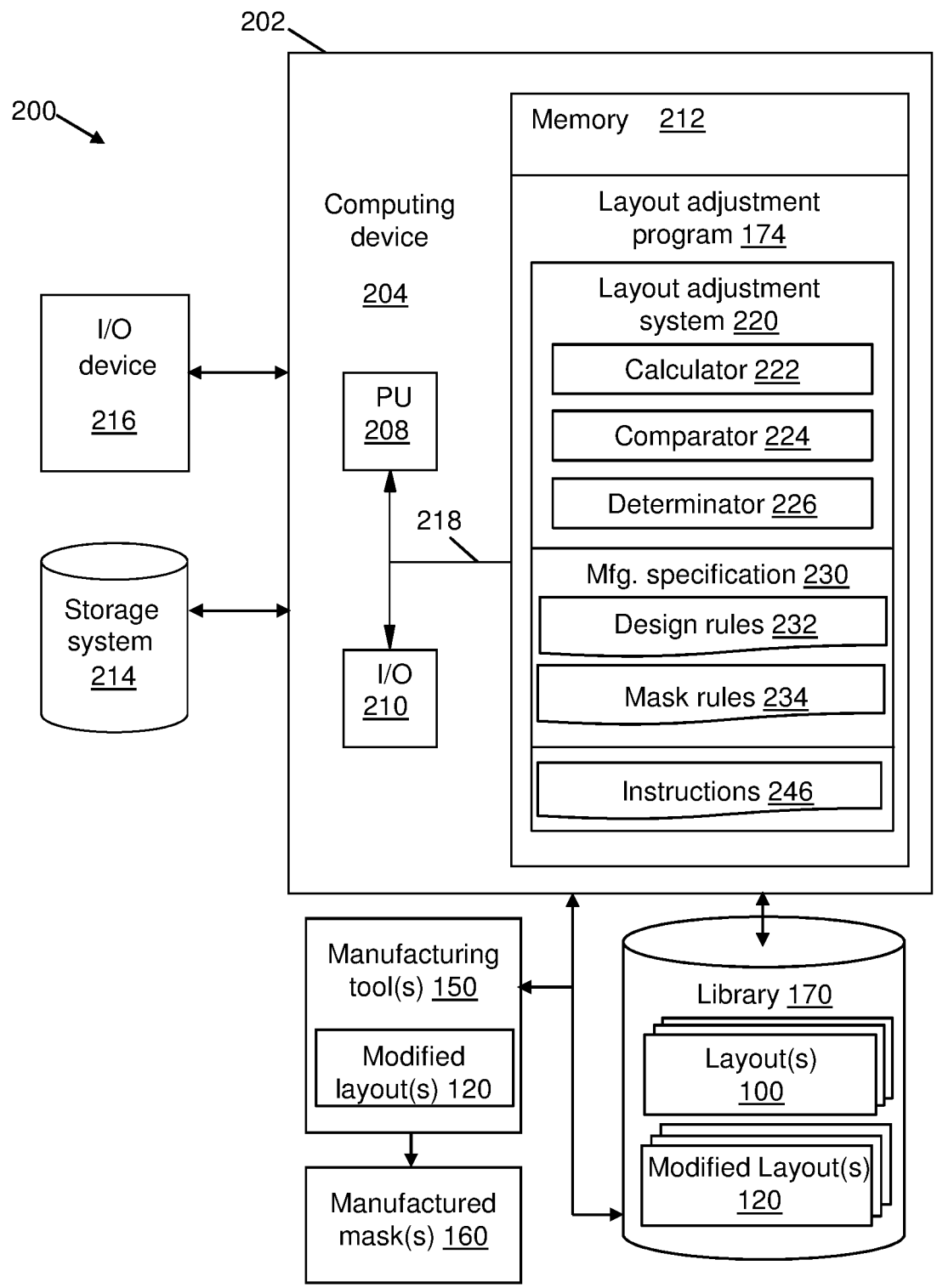
FIG. 7 depicts an illustrative environment, which includes a computer system configured to interact with a manufacturing tool and library for preventing corner violations according to embodiments of the disclosure.

Referring to FIG. 7, an illustrative environment 200 for implementing the methods and/or systems described herein is shown. In particular, a computer system 202 is shown to include computing device 204. Computing device 204 may include, e.g., a layout adjustment program 174 which may include, e.g., one or more sub-systems (layout adjustment system 220, for performing any/all of the processes described herein and implementing any/all of the embodiments described herein.

Computer system 202 is shown including a processing unit (PU) 208 (e.g., one or more processors), an I/O component 210, a memory 212 (e.g., a storage hierarchy), an external storage system 214, an input/output (I/O) device 216 (e.g., one or more I/O interfaces and/or devices), and a communications pathway 218. In general, processing unit 208 may execute program code, such as layout adjustment program 174, which is at least partially fixed in memory 212. While executing program code, processing unit 208 may process data, which may result in reading and/or writing data from/to memory 212 and/or storage system 214. Pathway 218 provides a communications link between each of the components in environment 200. I/O component 210 may include one or more human I/O devices, which enable a human user to interact with computer system 202 and/or one or more communications devices to enable a system user to communicate with the computer system 202 using any type of communications link. To this extent, layout adjustment program 174 may manage a set of interfaces (e.g., graphical user interface(s), application program interface(s), etc.) that enable system users to interact with layout adjustment program 174. Further, layout adjustment program 174 may manage (e.g., store, retrieve, create, manipulate, organize, present, etc.) data, through several modules contained within a layout adjustment system 220. Layout adjustment system 220 is shown by example as being a sub-system of layout adjustment program 174.

As noted herein, layout adjustment program 174 may include layout adjustment system 220. In this case, modules 222, 224, 226, 228, of layout adjustment system 220 may enable computer system 202 to perform a set of tasks used by layout adjustment program 174, and may be separately developed and/or implemented apart from other portions of layout adjustment program 174. Calculator 222 can implement various mathematical computations in processes discussed herein. Comparator 224 can compare two quantities and/or items of data in processes discussed herein. Determinator 226 may, e.g., make logical determinations based on compliance or non-compliance with various conditions in processes discussed herein. One or more modules 222, 224, 226, may use algorithm-based calculations, look up tables, software code, and/or similar tools stored in memory 212 for processing, analyzing, and operating on data to perform their respective functions. Each module discussed herein may obtain and/or operate on data from exterior components, units, systems, etc., or from memory 212 of computing device 204.

Layout adjustment program 174 may also include a catalogue of data expressed as a manufacturing specification ("mfg. specification") 230 which defines acceptable design characteristics and manufacturing parameters for layout(s) 100. As noted elsewhere herein, manufacturing specification 230 may include a catalogue of metrics for evaluating whether the design of each layout 100 is acceptable, e.g., the minimum corner-to-corner separation distance between pairs of discontinuous fill cells 104 (FIGS. 2-6). Manufacturing specification 230 may be subdivided into different sets of rules, each corresponding to the type of mask represented in layout 100. For instance, a BEOL layer mask may need to pass a "design rule check" (DRC) for the layer. The applicable rules for the DRC may be stored in a design rule field ("design rules") 232 of manufacturing specification 230. In the case of a FEOL layer mask, layout 100 must pass a "mask rule check" (MRC) defining a different set of requirements for the layout under analysis. The applicable rules for the MRC may be stored in a mask rule field ("mask rules") 234 of manufacturing specification 230. Other rules and/or forms of reference measurements, values, etc., may additionally or alternatively be stored in different fields of manufacturing specification 230. Layout adjustment system 220 and modules 222, 224, 226 thereof may cross-reference and apply data within manufacturing specification 230 to implement various processes according to the disclosure, e.g., determining whether corner violations 106 (FIGS. 2-6) exist in layout(s) 100.

In addition to working in conjunction with manufacturing specification 230, Layout adjustment system 220 may manipulate, interpret, and analyze various forms of information in library 170, including one or more existing layout(s) 100 for a particular mask layer or product. In addition, layout adjustment system 220 may generate modified layout(s) 120 by removing corner violation(s) 106 from each layout 100, and save modified layout(s) 120 in library 170. In further embodiments, layout adjustment program 174 may generate a set of instructions 246, and use instructions 246 to create modified layout(s) 120 from layout(s) 100 on library 170. Library 170 may form part of, or otherwise may be communicatively coupled to, computing device 204 through any individual or combination of physical and/or wireless data coupling components discussed herein. Some attributes of layout(s) 100 and/or modified layout(s) 120 may be converted into a data representation (e.g., a data matrix with several values corresponding to particular attributes) and stored electronically, e.g., within library 170, memory 212 of computing device 204, storage system 214, and/or any other type of data cache in communication with computing device 204.

Images and/or other representations of layout(s) 100 may additionally or alternatively be converted into data inputs or other inputs to layout adjustment program 174 with various scanning or extracting devices, connections to independent systems (e.g., library 170), and/or manual entry of a user. As an example, e.g., a user of computing device 204 could manually input layout(s) 100 and/or other forms of information to layout adjustment program 174. Following embodiments of the processes discussed herein layout adjustment program 174 of computing device 204 can output modified layout(s) 120 and/or instructions 246, and in some cases may automatically adjust manufacturing tool(s) 150 based on modified layout(s) 120 and/or instructions 246.

Computer system 202 may be operatively connected to or otherwise in communication with manufacturing tool(s) 150 having one or more manufacturing devices configured to construct IC masks from layouts 100 and modified layouts 120, e.g., as instructed by layout adjustment system 220 for preventing corner violations as discussed herein. Computer system 202 may be embodied as a unitary device in a semiconductor manufacturing plant coupled to manufacturing tool 150 and/or other devices, or may be multiple devices each operatively connected together to form computer system 202. Embodiments of the present disclosure may thereby include using layout adjustment program 174 to convert layout(s) 100 into modified layout(s) 120 by removing corner violation(s) 106 (FIGS. 2-6). As discussed herein, embodiments of the present disclosure may provide instructions 246 for adjusting manufacturing tool(s) 150 based on modified layout(s) 120, e.g., based on where exclusion layer(s) 130 (FIGS. 2-4) are targeted to remove corner violations 106.

Where computer system 202 includes multiple computing devices, each computing device may have only a portion of layout adjustment program 174 and/or layout adjustment system 220 (including, e.g., modules 222, 224, 226) fixed thereon. However, it is understood that computer system 202 and layout adjustment system 220 are only representative of various possible equivalent computer systems that may perform a process described herein. Computer system 202 may obtain or provide data, such as data stored in memory 212 or storage system 214, using any solution. For example, computer system 202 may generate and/or be used to generate data from one or more data stores, receive data from another system, send data to another system, etc.

Figure 8:
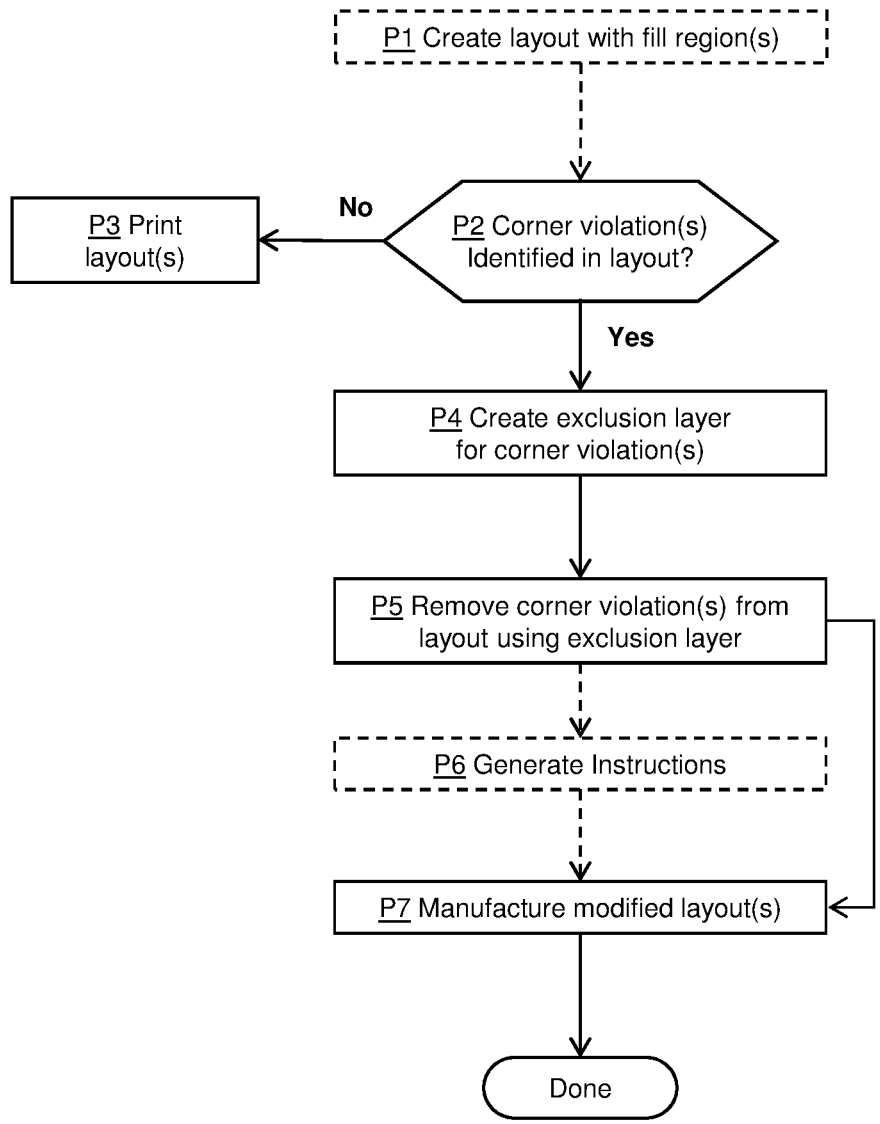
FIG. 8 provides an example flow diagram of a method for preventing corner violations according to embodiments of the disclosure.

Referring to FIGS. 2, 7, and 8 together, illustrative processes are shown for preventing corner violations in fell cells 104 of layout(s) 100. The steps and processes depicted in FIG. 8 may be implemented, e.g., with components of layout adjustment program 174, one or more modules 222, 224, 226 of layout adjustment system 220, and/or other components of computer system 202 described herein by example. A single and/or repeated execution of the processes discussed herein may allow for repeated use of manufacturing tool(s) 150 to manufacture masks for various layers and products while preventing corner violations in fill regions of the mask. In the example processes discussed herein, layout 100 will generally be described as including at least one pair of adjacent, discontinuous fill cells 104 therein, with some alternative examples referring to mask layouts with multiple pairs of fill cells which may exhibit corner violations. It is also understood that the present disclosure may be implemented with respect to multiple layouts 100 simultaneously and/or sequentially, with each layout 100 including fill cells 104 with any conceivable dimensions, in any conceivable number, etc., and that other examples are discussed herein where appropriate.

The various processes discussed herein, furthermore, may be implemented before, after, or during other processes to construct and use masks in the manufacture of IC products. The methodology discussed herein may be implemented through alternative embodiments of computer system 202. For example, one library 170 may be used for multiple layouts 100 in embodiments of the disclosure. Multiple libraries 170 and/or layout adjustment programs 174 may alternatively be applied to one layout 100. Further alternative examples may include different combinations or numbers of layouts 100, libraries 170, layout adjustment programs 174, etc.

In a precursor action before implementing methods according to the disclosure, a designer may create layout(s) 100 and the features therein. In the example of forming layout(s) 100 to include a minimum feature density, the designing of layout(s) may begin with designing and placing non-dummy features 102 to provide the functional characteristics of a layer. In this case, the next phase of designing layout(s) 100 may include forming and placing fill cell(s) 104 in the vacant space between on-dummy features 102 to increase the feature density of layout(s) 100. Process P1 in some cases may be implemented independently, e.g., by a separate manufacturing entity, before being provided to a circuit analysis entity to implement the analysis techniques described herein. Process P1 is therefore shown in phantom to illustrate this optional process according to embodiments. Layout(s) 100 may be submitted to manufacturing tool 150 and/or computer system 202, e.g., as inputs to I/O device 216 through a computer-readable storage medium and/or other computer-readable inputs to computer system 202. Computer system 202, in turn, can instruct manufacturing tool 150 delay the manufacture of layout(s) 100 until further processes according to the disclosure are completed. Embodiments of the disclosure thus permit computer system 202 and its components to modify layout 100 before manufacturing any masks based on the original layout(s) 100, e.g., by implementing the steps discussed herein along with various conventional processing techniques including design rule checking, mask rule checking, etc., as noted above to reduce the number of projected defects before manufacture.

Methods for removing corner violations in layout(s) 100 may include analyzing layout 100 to determine whether corner violations 106 exist between discontinuous pairs of fill cells 104. During this process, comparator 224 of layout adjustment system 220 may compare each pair of adjacent, discontinuous fill cells 104 with minimum spacing requirements included in manufacturing specification 230. The minimum spacing requirements may be further specified in design rules 232 for layout(s) 100 representing a BEOL layer, or in mask rules 234 for layout(s) 100 representing a FEOL layer. According to an example, each fill cell may have a width dimension along X-axis of approximately 0.48 µm, and a length dimension along Y-axis of approximately 0.48 µm. In the case of corner-to-corner bridges, comparator 224 can identify corner violations as being any fill cell(s) 104 in layout 100 with a length or width that is less than approximately 0.40 µm. In the case of two fill cell(s) 104 having too small of a corner-to-corner separation distance, comparator 224 can identify corner violations as being any adjacent, discontinuous fill cell(s) 104 with a corner-to-corner separation distance that is less than approximately 0.40 µm. Embodiments of the disclosure need not be implemented on layout(s) 100 which do not have any corner violation(s) 106. Where comparator 224 indicates that no corner violations 106 exist in layout 100 ("No" at process P2), the methodology may proceed to an alternative process P3 of manufacturing the IC mask(s) using layouts 100 which lack corner violations.

Where comparator 224 indicates that one or more corner violations 106 exist in layout 100 ("Yes" at process P2), the methodology instead proceeds to a process P4 of removing portions of fill cells 104 where corner violations 106 appear. Specifically, calculator 222 of layout adjustment system 220 may create exclusion layer 130 for each corner violation 106 in layout 100. The surface area of excluded fill material in exclusion layer 130 may be determined according to one or more formulas based on the dimensions of layout 100 and/or fill cells 140 therein. According to the previous example in which each fill cell 104 has a width and length of approximately 0.48 µm, exclusion layer 130 may define a square region with a smaller surface area as being excluded from layout 100. For instance, exclusion layer 130 may define a region of non-fillable space having a width along X-axis of approximately 0.24 µm length along Y-axis of approximately 0.24 µm. In an alternative example, exclusion layer may be a circular region in plane X-Y having a radius of approximately 0.15 µm. More generally, each portion of excluded fillable space may take the form of a polygonal region having a surface area that is less than the surface area of each fill cell 104, yet larger than the minimum separation distance between adjacent discontinuous fill cells 104. Calculator 222 may also calculate the positional coordinates of non-fillable space in exclusion layer 130 based on the location of each corner violation 106 in layout 100. Continuing with the same example, each square of excluded space may have a midpoint along X-axis and Y-axis that is the same as the corner-to-corner midpoint between fill cells 104 which cause corner violation 106. Exclusion layer 130 may define a single region of non-fillable space to account for a single corner violation 106, or may contain several regions of non-fillable space to account for several corner violations 106. Thus, exclusion layer 130 may take the form of a two-dimensional map capable of being superimposed onto layout 100 to define regions of non-fillable space where corner violations 106 exist.

Continuing to process P5, embodiments of the disclosure include removing each corner violation 106 from the fill region of layout 100 by using exclusion layer 130. It is emphasized that none of the original fill cells 104 are removed to form modified layout 120. According to one example, calculator 222 can simply subtract any portions of fill cell(s) 104 which overlap with exclusion layer 130 to yield modified layout 120 with portions of fill cells 104 removed. According to another example, modified layout 120 may be formed by mathematically superimposing exclusion layer 130 onto layout 100 to remove all corner violations 106. Process P6 may alternatively include any currently known or later developed algorithm, mathematical technique, etc., for generating a new layout in the form of modified layout 120 by using exclusion layer 130 to remove only selected portions of fill cells 104 from layout 100. At least a portion of the original fill cells 104 which had created corner violation 106 will continue to exist in modified layout 120, in contrast to the conventional process in which entire fill cells 104 are removed.

After corner violation(s) 106 are removed from layout 100 to create modified layout 120, layout adjustment system 220 may implement further steps to create masks with the same fill cells 104, but without any corner violation(s) 106 included. According to one non-limiting example shown by the phantom process flow in FIG. 8, the methodology may continue to a process P6 of generating instructions 246, indicative of modified layout 120, to be submitted to manufacturing tool(s) 150. Instructions 246 may take the form of computer code for altering the original form of layout 100 as expressed in manufacturing tool 150, a two-dimensional map of features to be printed in place of the original layout 100, and/or any other currently known or later developed process to replace layout 100 with modified layout 120. Instructions 246 can be based at least in part on, e.g., the location(s) where exclusion layer 130 were created to remove corner violation(s) 106, the new shape and surface area of modified fill cell(s) 104, a catalogue of changes in modified layout(s) 120 relative to the original layout(s) 100, etc. Instructions 246 thus may change various settings of manufacturing tool(s) 150 in process P7 such as etch time, deposition time, fill shape or printing area, and/or other properties of layout 100 to create modified layout 120.

A final step of the method may include process P7 of manufacturing mask(s) 160 based on modified layout 120. Process P7 may include, e.g., using manufacturing tool 150 to produce manufactured mask 160 based on modified layout 120 using instructions 246 from process P6. In further embodiments, it may be possible to use modified layout(s) 120 in manufacture without the aid of instructions 246. For example, manufacturing tool(s) 150 may not receive layout (s) 100 in their original form, and may simply receive modified layout(s) 120 after the conclusion of process P6. In this case, manufacturing tool(s) 150 uses only modified layout(s) 120 to create manufactured mask(s) 160, and no layout(s) 100 are transmitted to manufacturing tool 150 unless they originally lack corner violations 106. In any case, manufactured mask(s) 160 may include stepped region (s) 166 within fill cell(s) 104, and thus corner violations 106 are absent from manufactured mask(s) 160. The method may then conclude ("Done"), or may repeat after additional masks are provided to layout adjustment system for analysis.

As will be appreciated by one skilled in the art, aspects of the present disclosure may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module," or "system." Furthermore, aspects of the present invention may take the form of a computer program product embodied in one or more computer readable medium(s) having computer readable program code embodied thereon.

Any combination of one or more computer readable medium(s) may be used. A computer readable storage medium may be, for example, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that may contain, or store a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing. Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages, e.g., verification languages such as Calibre, ICV, and/or PVS. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, may be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that may direct a computer, other programmable data processing apparatus, or other devices to function in a particular manner, such that the instructions stored in the computer readable medium produce an article of manufacture including instructions which implement the function/act specified in the flowchart and/or block diagram block or blocks. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowcharts and block diagrams in the Figures illustrate the layout, functionality, and operation of possible implementations of systems, methods and computer program products according to various embodiments of the present invention. In this regard, each block in the flowchart or block diagrams may represent a module, segment, or portion of code, which includes one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, may be implemented by special purpose hardware-based systems that perform the specified functions or acts, or combinations of special purpose hardware and computer instructions.

As used herein, the term "configured," "configured to" and/or "configured for" may refer to specific-purpose patterns of the component so described. For example, a system or device configured to perform a function may include a computer system or computing device programmed or otherwise modified to perform that specific function. In other cases, program code stored on a computer-readable medium (e.g., storage medium), may be configured to cause at least one computing device to perform functions when that program code is executed on that computing device. In these cases, the arrangement of the program code triggers specific functions in the computing device upon execution. In other examples, a device configured to interact with and/or act upon other components may be specifically shaped and/or designed to effectively interact with and/or act upon those components. In some such circumstances, the device is configured to interact with another component because at least a portion of its shape complements at least a portion of the shape of that other component. In some circumstances, at least a portion of the device is sized to interact with at least a portion of that other component. The physical relationship (e.g., complementary, size-coincident, etc.) between the device and the other component may aid in performing a function, for example, displacement of one or more of the device or other component, engagement of one or more of the device or other component, etc.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method comprising:
    identifying, via at least one computing device, at least one corner violation in a fill region of an integrated circuit (IC) layout, wherein the at least one corner violation includes a pair of fill cells of the fill region having a corner-to-corner shape profile that violates a manufacturing specification for the fill region of the IC layout;
    creating, via the at least one computing device, an exclusion layer for the at least one corner violation of the IC layout;
    removing, via the at least one computing device, the at least one corner violation from the fill region using the exclusion layer to form a modified IC layout, wherein at least a portion of each of the pair of fill cells remains in the modified IC layout after removing the at least one corner violation; and
    manufacturing the modified IC layout to include a fill shape based on the fill region after removing the at least one corner violation, the fill shape being compliant with the manufacturing specification for the fill region of the IC layout.

2. The computer-implemented method of claim 1, wherein the IC layout comprises a plurality of back end of line (BEOL) layers, and wherein the manufacturing specification for the fill region of the IC layout includes a design rule.

3. The computer-implemented method of claim 1, wherein the IC layout comprises a front end of line (FEOL) layer, the manufacturing specification for the fill region of the IC layout includes a mask rule, and wherein a size of the exclusion layer is based on a minimum cell-to-cell spacing and separation width between fill cells in the FEOL layer.

4. The computer-implemented method of claim 1, wherein removing the corner violation from the fill region forms a stepped region in each of the pair of fill cells.

5. The computer-implemented method of claim 1, wherein the corner-to-corner shape profile that violates the manufacturing specification for the IC layout includes a corner-to-corner bridge between the pair of fill cells.

6. The computer-implemented method of claim 1, wherein the corner-to-corner shape profile that violates the manufacturing specification for the IC layout includes a corner-to-corner separation distance between the pair of fill cells being less than a threshold separation distance.

7. The computer-implemented method of claim 1, wherein the IC layout comprises a mask for multiple patterning fabrication, and wherein the fill region comprises a dummy fill region of the mask.

8. A computer program product stored on a computer readable storage medium, the computer program product comprising program code, which, when being executed by at least one computing device, causes the at least one computing device to:
    identify at least one corner violation in a fill region of an integrated circuit (IC) layout, wherein the at least one corner violation includes a pair of fill cells of the fill region having a corner-to-corner shape profile that violates a manufacturing specification for the fill region of the IC layout;
    create an exclusion layer for the at least one corner violation of the IC layout;
    remove the at least one corner violation from the fill region using the exclusion layer to form a modified IC layout, wherein at least a portion of each of the pair of fill cells remains in the modified IC layout after removing the at least one corner violation; and
    cause a manufacturing device to manufacture the modified IC layout to include a fill shape based on the fill region after removing the at least one corner violation, the fill shape being compliant with the manufacturing specification for the fill region of the IC layout.

9. The computer program product of claim 8, wherein the IC layout comprises a plurality of back end of line (BEOL) layers, and wherein the manufacturing specification for the fill region of the IC layout includes a design rule.

10. The computer program product of claim 8, wherein the IC layout comprises a front end of line (FEOL) layer, the manufacturing specification for the fill region of the IC layout includes a mask rule, and wherein a size of the exclusion layer is based on a minimum cell-to-cell spacing and separation width between fill cells in the FEOL layer.

11. The computer program product of claim 8, wherein removing the corner violation from the fill region forms a stepped region in each of the pair of fill cells.

12. The computer program product of claim 8, wherein the corner-to-corner shape profile that violates the manufacturing specification for the IC layout includes a corner-to-corner bridge between the pair of fill cells.

13. The computer program product of claim 8, wherein the corner-to-corner shape profile that violates the manufacturing specification for the IC layout includes a corner-to-corner separation distance between the pair of fill cells being less than a threshold separation distance.

14. The computer program product of claim 8, wherein the IC layout comprises a mask for multiple patterning fabrication, and wherein the fill region comprises a dummy fill region of the mask.

15. A system comprising at least one computing device configured to perform a method by performing actions including:
  identifying at least one corner violation in a fill region of an integrated circuit (IC) layout, wherein the at least one corner violation includes a pair of fill cells of the fill region having a corner-to-corner shape profile that violates a manufacturing specification for the fill region of the IC layout;
  creating an exclusion layer for the at least one corner violation of the IC layout;
  removing the at least one corner violation from the fill region using the exclusion layer to form a modified IC layout, wherein at least a portion of each of the pair of fill cells remains in the modified IC layout after removing the at least one corner violation; and
  manufacturing the modified IC layout to include a fill shape based on the fill region after removing the at least one corner violation, the fill shape being compliant with the manufacturing specification for the fill region of the IC layout.

16. The system of claim 15, wherein the IC layout comprises a plurality of back end of line (BEOL) layers, and wherein the manufacturing specification for the fill region of the IC layout includes a design rule.

17. The system of claim 15, wherein the IC layout comprises a front end of line (FEOL) layer, the manufacturing specification for the fill region of the IC layout includes a mask rule, and wherein a size of the exclusion layer is based on a minimum cell-to-cell spacing and separation width between fill cells in the FEOL layer.

18. The system of claim 15, wherein the IC layout comprises a mask for multiple patterning fabrication, and wherein the fill region comprises a dummy fill region of the mask.

19. The system of claim 15, wherein the corner-to-corner shape profile that violates the manufacturing specification for the IC layout includes a corner-to-corner bridge between the pair of fill cells.

20. The system of claim 15, wherein the corner-to-corner shape profile that violates the manufacturing specification for the IC layout includes a corner-to-corner separation distance between the pair of fill cells being less than a threshold separation distance.

* * * * *